June 14, 1949.　　　　F. NETTEL ET AL　　　　2,472,846
HEAT POWER PLANT
Filed Jan. 9, 1945　　　　2 Sheets-Sheet 1

INVENTORS
Frederick Nettel.
Johus Kreiner

June 14, 1949.  F. NETTEL ET AL  2,472,846
HEAT POWER PLANT

Filed Jan. 9, 1945  2 Sheets-Sheet 2

Inventors
Frederick Nettel.
John Treiber.

Patented June 14, 1949

2,472,846

UNITED STATES PATENT OFFICE 2,472,846

HEAT POWER PLANT

Frederick Nettel, Manhasset, and John Kreitner, New York, N. Y.

Application January 9, 1945, Serial No. 572,085

7 Claims. (Cl. 60—49)

This invention deals with air expansion power plants of the continuous heating system where power is produced by expansion of compressed and heated air and with the fueling of such plants.

The present art knows power systems operating on semi-closed cycles in which air issuing from a turbine at superatmospheric pressure is used as combustion air in supercharged furnaces for heating the compressed air at top pressure, and to expand the combustion gases thereafter in secondary turbines to atmospheric pressure.

These and similar known arrangements show low efficiencies due to the large heat loss in the exhaust gases from the plants. They hardly permit efficient utilization of ash-forming solid fuels; also starting and load regulation are difficult.

It is the basic object of this invention to avoid these and other drawbacks and to permit lowest grade liquid or solid fuels, particularly coal, to be utilized in semi-closed air expansion power systems of large output, in a simple manner.

This and other more specific objects are effected by the invention as will be apparent from the following description and claims taken in accordance with the accompanying drawings, forming a part of this application, in which:

Figure 1:
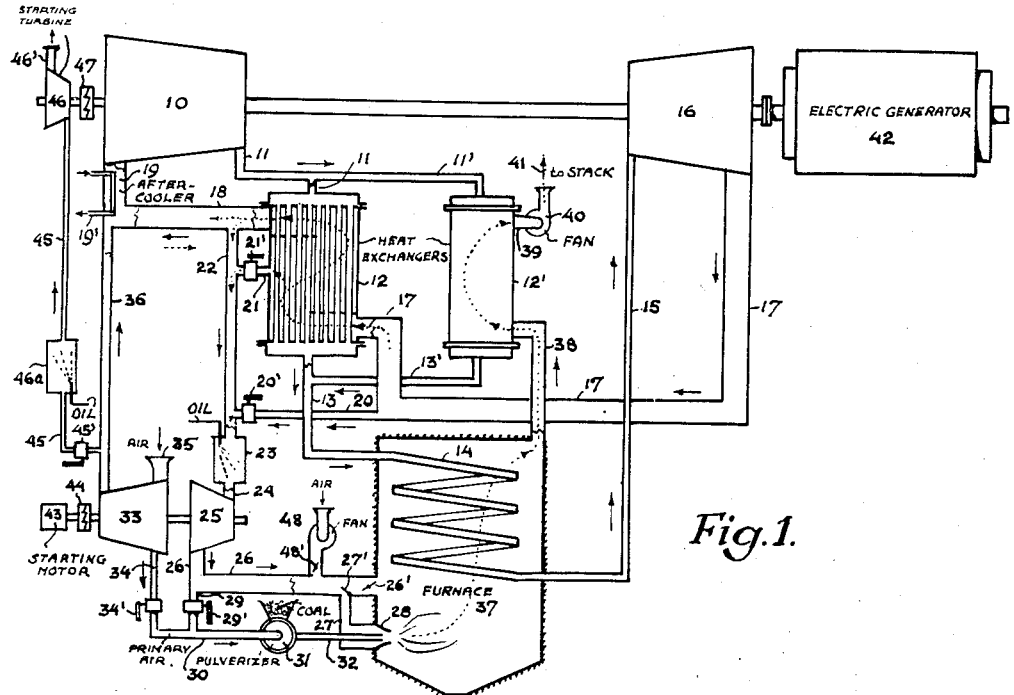
Fig. 1 is a diagrammatic view of the improved power plant in a simple form.

The drawings accompanying this specification illustrate by way of non-limiting examples more or less diagrammatically arrangements of apparatus embodying the invention:

In Fig. 1, representing a plant of the simplest kind for utilizing pulverized coal, compressor 10 compresses air which leaves via pipes 11 and 11' through recuperative heat exchangers (air preheater means) 12 and 12', where it is warmed by exhaust heat, thence through pipes 13 and 13' which join to the heating coil 14 disposed in the furnace chamber 37 where it is heated further to top temperature, leaving the latter coil through pipe 15 to enter the main air turbine 16. The air leaves partially expanded through pipe 17 which leads it to the heating side of the recuperative heat exchanger 12, wherein it gives part of its heat up to the compressed air coming from compressor 10, leaving 12 via pipe 18 to flow through after-cooler 19, with tube system 19' for the cooling medium, and back to the intake of compressor 10, in a substantially closed circuit. Branched off from pipe 18 is pipe 22, into which also the branch pipes 20 with valve 20' and 21 with valve 21' join. Pipe 22 leads to a combustion chamber 23 for oil fuel which is connected by pipe 24 to the intake of secondary gas turbine 25. In 25 the air expands further to near-atmospheric pressure, leaving partly through duct 26 via flap valve 26' into the furnace chamber 37, while another part flows via duct 27, with flap valve 27' to the pulverized coal burner 28. 31 is a coal pulverizer mill which receives air for blowing the coal powder into the furnace, and possibly also for drying the coal in the mill, from branch pipe 29 with valve 29'. This so-called primary air enters the mill through pipe 30 and the air-coal mixture enters the furnace through pipe 32. Turbine 25 is coupled to drive the secondary compressor 33 which takes in air at 35 from the atmosphere and discharges compressed air through pipe 36 connected to the main air circuit at a point in front of the after-cooler 19. 38 is a duct for the combustion gases from furnace 37, for leading them to the recuperative heat exchanger 12'. After flowing through the latter as indicated by the dotted line, these gases enter the induced draft fan 40 through duct 39, leaving at 41 to the stack (atmosphere). An air bleeder pipe 34 from compressor 33, with valve 34' is connected to pipe 30. From pipe 36 a branch pipe 45 with valve 45' and interposed combustion chamber 46a for oil fuel leads to starting turbine 46 which is mechanically coupled to the shaft of compressor 10 by an overrunning clutch 47. A starting motor 43 of any kind is coupled to shaft of compressor 33 also via an overrunning clutch 44. As shown, compressor 10, turbine 16 and electric generator 42 for supplying useful energy are all arranged on a common shaft.

Forced draft fan 48 is arranged to discharge air taken from the atmosphere via flap valve 48' into duct 26.

The plant is started and operated as follows: Starting motor 43 is operated from an auxiliary source of energy and turbine-compressor set 25, 33 begins to rotate. The air from compressor 33 flows through pipe 36, through pipe 18, as indicated by dotted arrow, through pipe 22 to combustion chamber 23 where it is energized by burning oil fuel in it, and to the turbine 25, thus enabling it to drive compressor 33. With increasing temperature at 24 the secondary set speeds up and soon becomes power self-supporting, operating as open Brayton cycle, exhausting through 26, 37, 38, 39, 40 and to the atmosphere at 41. Motor 43 can now be stopped. Then valve 45' is gradually opened and combustion chamber 46a started by burning oil fuel in that air; the resulting hot gases reach the turbine 46, expand in it and leave at 46' to the atmosphere. The main shaft connecting 10, 16 and 42 starts to rotate. As soon as a certain flow is established in the main circuit which is under the same pressure as prevails in 36, pulverized coal is fed into the furnace 37 and ignited in the air-gas mixture from turbine 25. The flame begins to heat the air flowing through coil 14 which soon enables the turbine 16 to drive the compressor 10 so that turbine 46 can be stopped and uncoupled. The pressure in the main circuit now increases fast with increasing heating in furnace 37 until the main set reaches its full speed when it is ready to take load. With increasing temperature in pipe 15 also the temperature of the air leaving the turbine in pipe 17 rises. Under suitable design conditions this air, even after having passed through heat exchanger 12, may be hot enough when reaching pipe 22 to drive turbine 25, so that the oil burner in 23 can be stopped. The power self-supporting secondary set takes a certain quantity of hot air out of the main circuit, replacing it by an equal quantity of colder air through 36. If a higher load is required the pressure range in the main circuit must be raised. Such rise can be achieved if the secondary compressor 33 is speeded up. To do this the secondary turbine must supply more power which it can do only if it receives hotter air. To this end valve 21' is opened, admitting air into 22 which has not passed through the whole recuperator 12 and therefore is hotter than that in pipe 18. The hotter air admixes with the air from 18 with the result that turbine 25 gets hotter air and can develop sufficient power to drive 33 at a higher speed. If a still higher load is required valve 21' may be closed and valve 20' opened instead admitting still hotter air from pipe 17. The secondary set will speed up further and the pressures in the main circuit rise still further enabling more fuel to be burned in furnace 37 and correspondingly more power to be developed by generator 42. Under overload conditions the auxiliary combustion chamber may be utilized for reheating the air in front of turbine 25.

The secondary turbine 25 has a second important function, namely, to supply hot air from the main circuit, after it has usefully expanded to near-atmospheric pressure, to furnace 37 as combustion air in the latter. It is obviously not necessary that turbine 25 should under all load conditions be capable of supplying all necessary combustion air. It may be designed to furnish only a portion of the full load requirements, say 80 percent. In that case the remaining 20 percent are supplied by forced draft fan 48. Since that air is cold, the furnace efficiency may be somewhat lowered at loads above 80 percent of full load, which is admissible or even desirable in some cases if first costs are reduced thereby.

The furnace exhaust gases are most efficiently utilized in the recuperator 12' allowing stack temperatures to be reached as low as in modern steam boiler plants.

Normally all turbines and the greater part of the recuperator surface carry only pure air which reduces maintenance costs and increases reliability irrespective of fuel used.

The temperature of the primary air in pipe 30 is often limited by the nature of the coal used, especially when this air is used also for drying the coal in the mill 31. In order to reduce this temperature, valve 34' is opened allowing colder air from an intermediate stage of 33 to mix with air from 25.

Starting turbine 46 needs to be designed only for a comparatively small gas quantity, and for best performance at the speed necessary for starting the main set which is normally only a small fraction of the latter's full speed. The overrunning clutch 47 automatically uncouples turbine 46 when the speed of the main set rises above the starting speed. Normally it will be advantageous for turbine 46 to drive the main shaft via a speed reduction gear of any kind.

Figure 2:
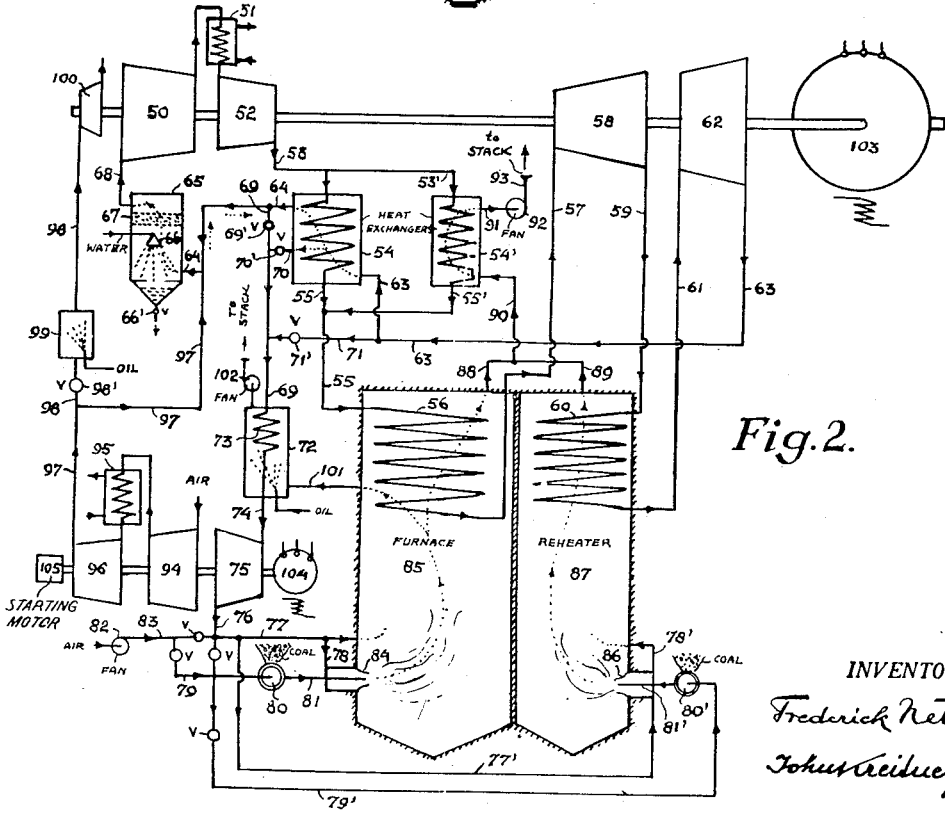
Fig. 2 is a diagrammatic view of another embodiment of the improved power plant including certain refinements to further increase the efficiency and convenience of operation.

Fig. 2 shows an embodiment including refinements in the main circuit (intercooling and reheating) which are per se known to greatly improve efficiency; intercooling for the secondary compressor, and indirect heating of the air for the secondary turbine during starting. Such plants are particularly suited for high-efficiency power stations of large output. The main circuit in this case comprises: stage compressor 50, intercooler 51, stage compressor 52, air conduits 53 and 53', heat exchangers (heated sides) 54 and 54', conduits 55 and 55', heater coil 56, tube 57, high pressure air turbine 58, pipe 59, reheater coil 60, pipe 61, medium pressure turbine 62, pipe 63, heat exchanger 54 (heating side), pipe 64, after-cooler 65, tube 68, and back to the intake of compressor 50. The secondary air turbine 75 can be supplied with air alternatively or jointly from three different points in the main circuit: (a) via pipe 69, valve 69' branched off from pipe 64; (b) via pipe 70 and valve 70' branched off from the interior of heat exchanger 54, and (c) via pipe 71 with valve 71' branched off from pipe 63. Obviously the temperatures at these points increase from (a) to (c), making possible efficient regulation of the secondary turbine 75 as described for Fig. 1. Interposed in the path to 75 is a combustion chamber 72 for heating the air by fuel in two different manners: During starting an oil burner as indicated heats air coil 73. Under special operating conditions hot combustion gases can be sucked through 72 by the induced draft fan 102 via duct 101 from furnace 85. The exhaust air from turbine 75 supplies combustion air to furnace 85 and to the reheater furnace 87 via ducts 77 and 77' and 78 and 78'. Primary air is supplied to the pulverizer mills 80 and 80' via ducts 79 and 79'. The coal-air mixture is blown into the furnaces by pipes 81 and 81'. Forced draft fan 82 discharges via pipe 83 into ducts 77 and/or 79. The various valves V shown permit the switching of the air streams either to the burners or to the ducts 77, 78, 77' and 78'. The secondary compressor consists in this case of stage compressor 94, intercooler 95, stage compressor 96, discharging through pipe 97 into pipe 64 of the main circuit. The gases from furnaces 85 and 87 discharge as indicated by dotted lines into ducts 88 and 89 which join into duct 90, connected to the heat exchanger 54', through the latter and out at 91, further through induced draft fan 92 into the stack (atmosphere). Instead of a surface type after-cooler as in Fig. 1, a spray-type intercooler is indicated 65, with water spray 66 from an available source, a water discharge valve 66' at the bottom, and a layer of filling bodies 67 to prevent entrainment of water particles into compressor 50.

The secondary turbine compressor set is started by auxiliary motor 105. The starting of the main set is effected in the same way as for Fig. 1 via pipe 98 with valve 98', combustion chamber 99 and starting turbine 100. Main electric generator 103 is shown coupled with compressors 50 and 52 and turbines 58 and 62. It is, however, within the scope of this invention to arrange this generator coupled with one of the main turbines and possibly a stage compressor on a separate shaft.

Shown coupled with the secondary turbine-compressor set is further auxiliary electric generator 104. If designed as A. C. generator it will furnish variable frequency in accordance with the variable speed of this set with the load. Since the frequency increases with the load this generator can be utilized for supplying the motors of the various auxiliaries such as fuel pumps, cooling water pumps, fans whose output must increase with the load. If designed for D. C. this generator can supply voltage increasing with the load and in a similar convenient way supply D. C. motors with variable voltage causing them to operate at speeds increasing with the load.

Operation of the plant is in principle the same as for Fig. 1 though the heating in the two furnaces may be independently adjusted within certain ranges of operation. It is obviously possible to incorporate more than one intercooler and more than one reheater in the main circuit, and it is possible to use coal on grates or stokers in one or all furnaces. In case of disturbances and sudden loss of load forced draft fan 82 may be used to cool the coils 56 and 60 in the furnaces in order to prevent damage to the tube material. Instead of a common after-cooler 65 for the air in the main circuit and the air from the secondary compressor, a secondary after-cooler may be provided for the air in pipe 97 in which case pipe 97 is preferably connected to pipe 68.

Figure 3:
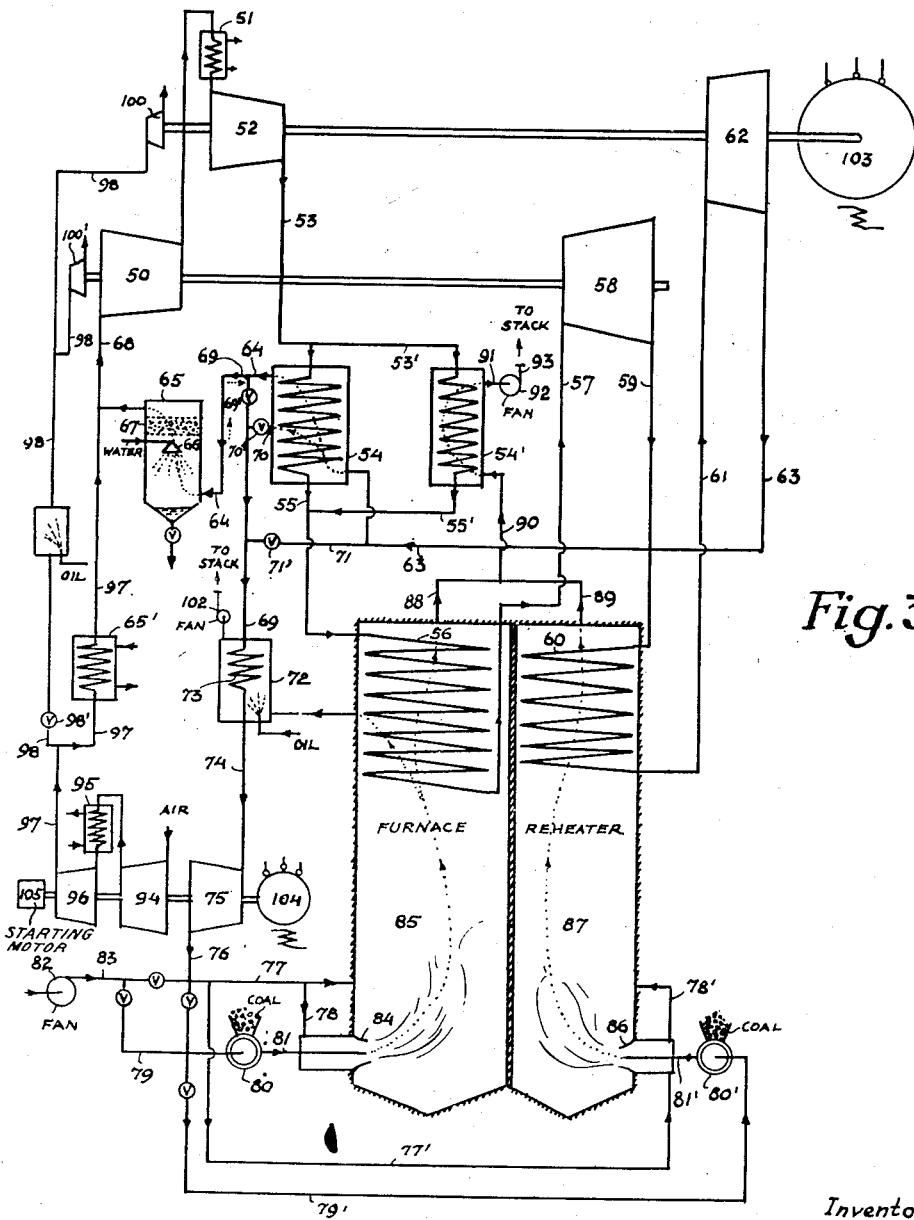
Fig. 3 shows in diagram form a modification of the power plant as per Fig. 2.

Fig. 3 illustrates a modification of plant as per Fig. 2, in that compressor 52 and turbine 62 are arranged on one shaft, while compressor 50 and turbine 58 are disposed on another shaft. Furthermore, the air from the secondary compressor 96 passes via pipe 97 through a separate after cooler 65' into pipe 68 of the main circuit. For starting the second shaft of the main circuit, another starting turbine 100' is connected to pipe 98. In all other respects the plant as per Fig. 3 is identical with that shown in Fig. 2.

The novel and advantageous features of power plants according to this invention may be summarized as follows:

(1) Reduction in size of, and energy loss in the after-cooler due to taking out hot air from the main circuit and replacing it by colder air.

(2) Increase in efficiency by driving the secondary compressor by heat taken from the main circuit which in part is waste heat.

(3) Increase in furnace efficiency by using the warm exhaust from the secondary air turbine as combustion air in said furnace.

(4) By burning fuel at near-atmospheric pressure the furnace design and operation is simplified and the use of ash-forming solid fuels facilitated.

(5) Overall efficiency is increased by transferring part of the heat in the gases from the furnace back to the compressed air in the main circuit.

(6) Reduction of energy requirements for starting by using the secondary turbine-compressor set as independent power self-supporting producer of compressed air.

(7) Simple and fast responsive load regulation.

It is immaterial for the purposes of this invention what particular types of compressors and turbines are used, whether the turbines in the main circuit are arranged in series or parallel as regards the flow of the air through them, what types of furnaces, combustion chambers, coolers and reheaters are employed, and what kind of power consuming device is driven.

Having now described and illustrated three forms embodying our invention, we wish it to be understood that our invention is not to be limited to the specific form or arrangement of parts, herein described and shown, except as limited by our claims.

What we claim is:

1. In a combustion turbine power plant of the continuous heating type, including air turbo-compressor means, one or more turbine type air expansion means, air preheater means for compressed air arranged on the heated side in two parallel flow paths, surface type fuel burning air heater means, furnace means, air cooler means, conduit means for admitting to said compressor means air of substantially super-atmospheric pressure, conduit means for the further compressed air issuing from said turbo-compressor means connected to both said parallel flow paths of said air preheater means, thence to the heated side of said surface type fuel burning air heater means for transferring to said further compressed air combustion heat released in said furnace under near-atmospheric pressure, thence to the inlet of said air expansion system, coupling means connecting one turbine of said expansion system to said compressor means for driving same, coupling means connecting one turbine of said expansion system to power consuming means for driving same, conduit means for the air issuing from said expansion system at substantially the same super-atmospheric pressure as at the inlet to said turbo-compressor means for leading said air stream through the heating side of one branch of said air preheater means, thence through said air cooler means, and thence back to the inlet of said turbo-compressor means in a substantially closed main circuit, secondary air compressor means for taking in air from the ambient atmosphere, conduit means for connecting the outlet of said secondary compressor means to said main circuit at a point between the outlet from said air preheater means and the inlet to said turbo-compressor means, secondary gas turbine means, coupling means for connecting said secondary turbine means to said secondary compressor means for driving same, conduit means for branching off part of the air issuing from the main circuit expansion system at a point between the outlet from said expansion system and the inlet to said air cooler means for leading said air to said secondary turbine means for expansion therein to near-atmospheric pressure, conduit means for leading said expanded air from the outlet of said secondary turbine means to said furnace to serve therein as combustion air, conduit means for passing the combustion gases from said furnace, after heat exchange in said air heater means to the compressed air issuing from said air preheater means, through the heating side of the second branch of said air preheater means, and thence exhausting them to the atmosphere.

2. A combustion turbine power plant according to claim 1, in which the air expansion means comprise a high-pressure turbine and a low-pressure turbine, surface type fuel burning heating means disposed to heat the compressed air passing from both flow paths of said air preheater means to the high-pressure turbine and surface type fuel burning heating means for heating the compressed air passing from the high-pressure turbine to the low-pressure turbine.

3. In a combustion turbine power plant according to claim 1, auxiliary fuel burning heating means disposed in the air conduit means branched off to the secondary turbine.

4. In a combustion turbine power plant according to claim 1, blower means for supplying additional combustion air from the ambient atmosphere at near-atmospheric pressure to said furnace.

5. In a combustion turbine power plant according to claim 1, a starting turbine disposed for driving the shaft of the turbo-compressor-power turbine set, a clutch for disconnecting said starting turbine from the turbo-compressor-power turbine set when the speed of the latter is substantially lower than its normal speed, and valved conduit means connected to the pressure side of said secondary compressor for leading compressed air to said starting turbine.

6. In a combustion turbine power plant according to claim 1, a plurality of conduits connecting said secondary turbine to a plurality of points along the path from the turbine system outlet to said air cooler means, and valve means for branching off the air stream to said secondary turbine at any one of said points.

7. In a combustion turbine power plant according to claim 1, power consuming means disposed to be driven by the secondary turbine.

FREDERICK NETTEL.
JOHN KREITNER.

REFERENCES CITED

The following references are of record in the file of this patent:

FOREIGN PATENTS

| Number | Country | Date |
|---|---|---|
| 213,322 | Switzerland | May 1, 1941 |